US011916284B2

(12) United States Patent
Colapietro (10) Patent No.: US 11,916,284 B2
(45) Date of Patent: *Feb. 27, 2024

(54) SMALL CELL ANTENNA ASSEMBLY AND MODULE FOR SAME

(71) Applicant: CommScope Technologies LLC, Hickory, NC (US)

(72) Inventor: Julian R. Colapietro, McKinney, TX (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,205

(22) Filed: Sep. 26, 2022

(65) Prior Publication Data

US 2023/0013649 A1 Jan. 19, 2023

Related U.S. Application Data

(63) Continuation of application No. 16/889,876, filed on Jun. 2, 2020, now Pat. No. 11,462,819.

(60) Provisional application No. 62/968,230, filed on Jan. 31, 2020, provisional application No. 62/858,561, filed on Jun. 7, 2019.

(51) Int. Cl.
*H01Q 1/24* (2006.01)
*H01Q 1/12* (2006.01)
*H04B 1/38* (2015.01)
*H01Q 23/00* (2006.01)

(52) U.S. Cl.
CPC ........... *H01Q 1/246* (2013.01); *H01Q 1/1242* (2013.01); *H01Q 23/00* (2013.01); *H04B 1/38* (2013.01)

(58) Field of Classification Search
CPC ...... H01Q 1/246; H01Q 1/1242; H01Q 23/00; H04B 1/38
See application file for complete search history.

(56) References Cited

U.S. PATENT DOCUMENTS

| | | | |
|---|---|---|---|
| 5,641,141 A | 6/1997 | Goodwin | |
| 5,966,102 A | 10/1999 | Runyon | |
| 5,995,063 A * | 11/1999 | Somoza | H01Q 1/12 343/890 |
| 6,999,042 B2 | 2/2006 | Dearnley et al. | |
| 7,106,273 B1 | 9/2006 | Brunson et al. | |
| 9,209,523 B2 | 12/2015 | Ma et al. | |

(Continued)

*Primary Examiner* — Junpeng Chen
(74) *Attorney, Agent, or Firm* — Myers Bigel, P.A.

(57) ABSTRACT

An antenna assembly includes: a plurality of antenna-radio units, each of the antenna-radio units comprising an antenna and a radio transceiver in an integrated unit, each antenna having an external face; and a mounting assembly comprising a foundation, a cap and a spine, the foundation being mounted to a lower end of the spine and the cap mounted to an upper end of the spine. The antenna-radio units are mounted at circumferentially equally spaced locations between the foundation and the cap, with their respective external faces facing radially outwardly. The assembly also includes a plurality of spacers, each spacer located between two adjacent antenna-radio units, and each antenna-radio unit between located between two adjacent spacers, each of the spacers including an arcuate external surface. The external faces of the antennas and the external surfaces of the spacers generally define a cylinder.

16 Claims, 9 Drawing Sheets

(56) References Cited

U.S. PATENT DOCUMENTS

| | | | |
|---|---|---|---|
| 9,768,513 B2 | 9/2017 | Lee et al. | |
| 9,807,032 B2 | 10/2017 | Merola | |
| 9,997,825 B2 | 6/2018 | Hendrix et al. | |
| D882,829 S | 4/2020 | Bouchard | |
| 2006/0092078 A1 | 5/2006 | Sanford | |
| 2012/0132781 A1* | 5/2012 | Kolokotronis | H01Q 1/1242 |
| | | | 248/535 |
| 2015/0017937 A1 | 1/2015 | Colapietro et al. | |
| 2015/0057047 A1 | 2/2015 | Hendrix et al. | |
| 2015/0349399 A1* | 12/2015 | Lasier | H01Q 1/1242 |
| | | | 248/542 |
| 2018/0026327 A1 | 1/2018 | Hendrix et al. | |
| 2018/0191056 A1 | 7/2018 | Billard et al. | |
| 2018/0351245 A1 | 12/2018 | Constance et al. | |

\* cited by examiner

SMALL CELL ANTENNA ASSEMBLY AND MODULE FOR SAME

RELATED APPLICATION

The present application is a continuation of and claims priority to U.S. patent application Ser. No. 16/889,876, filed Jun. 2, 2020, now U.S. Pat. No. 11,462,819, which claims priority from and the benefit of U.S. Provisional Application Nos. 62/858,561, filed Jun. 7, 2019, and 62/968,230, filed Jan. 31, 2020, the disclosures of which are hereby incorporated herein by reference in full.

FIELD OF THE INVENTION

The present invention is directed generally toward communication antennas, and more particularly to mounting structures for communications antennas.

BACKGROUND

As wireless data service demands have grown, a conventional response has been to increase the number and capacity of conventional cellular Base Stations (Macro-Cells). The antennas used by such Macro-Cells are typically mounted on antenna towers. A conventional antenna tower has three or four legs on which antennas and supporting remote radio units (RRUs) are mounted. However, in some environments structures known as "monopoles" are used as mounting structures. Monopoles are typically employed when fewer antennas/RRUs are to be mounted, and/or when a structure of less height is required.

In addition, Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "metrocells") are mounted on monopoles.

In view of the foregoing, it may be desirable to provide additional monopole arrangements.

SUMMARY

As a first aspect, embodiments of the invention are directed to an antenna assembly comprising: a plurality of antenna-radio units, each of the antenna-radio units comprising an antenna and a radio transceiver in an integrated unit, each antenna having an external face; a mounting assembly comprising a foundation, a cap and a spine, the foundation being mounted to a lower end of the spine and the cap mounted to an upper end of the spine; wherein the antenna-radio units are mounted at circumferentially equally spaced locations between the foundation and the cap, with their respective external faces facing radially outwardly; and a plurality of spacers, each spacer located between two adjacent antenna-radio units, and each antenna-radio unit between located between two adjacent spacers, each of the spacers including an arcuate external surface. The external faces of the antennas and the external surfaces of the spacers generally define a cylinder.

As a second aspect, embodiments of the invention are directed to an antenna assembly comprising: three antenna-radio units, each of the antenna-radio units comprising an antenna and a radio transceiver in an integrated unit, each antenna having an external face; a mounting assembly comprising a foundation, a cap and a spine, the foundation being mounted to a lower end of the spine and the cap mounted to an upper end of the spine, wherein the antenna-radio units are mounted at circumferentially equally spaced locations between the foundation and the cap, with their respective external faces facing radially outwardly; and three spacers, each spacer located between two adjacent antenna-radio units, each of the spacers including an arcuate external surface. The external faces of the antennas and the external surfaces of the spacers generally define a cylinder.

As a third aspect, embodiments of the invention are directed to an antenna assembly comprising: a plurality of antenna-radio units, each of the antenna-radio units comprising an antenna and a radio transceiver in an integrated unit, each antenna having an external face; a mounting assembly comprising a foundation, a cap and a spine, the foundation being mounted to a lower end of the spine and the cap mounted to an upper end of the spine, the foundation and cap being frusto-conical and generally mirror images, wherein the antenna-radio units are mounted at circumferentially equally spaced locations between the foundation and the cap, with their respective external faces facing radially outwardly; and a plurality of spacers, each spacer located between two adjacent antenna-radio units, and each antenna-radio unit between located between two adjacent spacers, each of the spacers including an arcuate external surface. The external faces of the antennas and the external surfaces of the spacers generally define a cylinder.

As a fourth aspect, embodiments of the invention are directed to an antenna assembly comprising: a plurality of antenna-radio units, each of the antenna-radio units comprising an antenna and a radio transceiver in an integrated unit, each antenna having an external face; a mounting assembly comprising a foundation, a cap and a spine, the foundation being mounted to a lower end of the spine and the cap mounted to an upper end of the spine, the foundation and cap being generally cylindrical, wherein the antenna-radio units are mounted at circumferentially equally spaced locations between the foundation and the cap, with their respective external faces facing radially outwardly; and a plurality of spacers, each spacer located between two adjacent antenna-radio units, and each antenna-radio unit between located between two adjacent spacers, each of the spacers including an arcuate external surface. The external faces of the antennas and the external surfaces of the spacers generally define a cylinder.

As a fifth aspect, embodiments of the invention are directed to a monopole assembly comprising: an elongate monopole; an antenna module mounted adjacent a top end of the monopole; and a placeholder module mounted beneath the antenna module, the placeholder module comprising a foundation, a cap, and a vertical spine extending between the foundation and the cap, the foundation module further comprising a pair of mating cover halves, the cover halves being semi-cylindrical and sized so that, when in a mated condition, a diameter of the cover halves is substantially equal to a diameter of the foundation.

DETAILED DESCRIPTION

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Figures 7, 8:
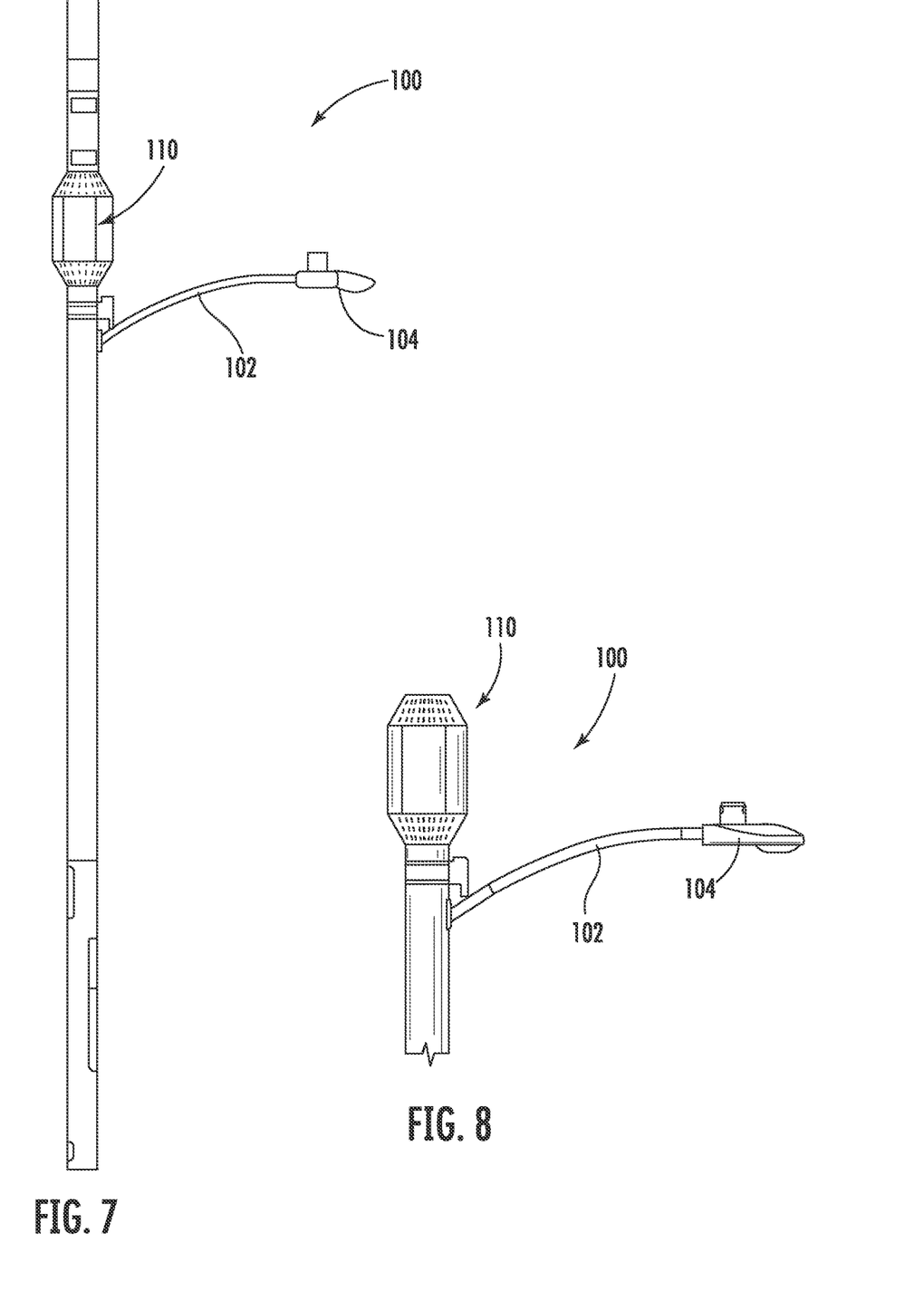
FIG. 7 is a front view of a monopole according to embodiments of the invention on which an antenna assembly of FIG. 1 is mounted.
FIG. 8 is an enlarged front view of the monopole of FIG. 7 showing the antenna assembly and the arm with a luminaire mounted thereon.

Referring now to the drawings, a telecommunications monopole designated at 100 is shown in FIGS. 7 and 8. As can be seen in FIGS. 7 and 8, the monopole 100, which is sized as a "metrocell" having a diameter of between about 10 to 20 inches and a height of between about 20 and 40 feet, is styled as a streetlight, with an arm 102 that mounts a luminaire 104 (such as an LED streetlight).

Figure 1:
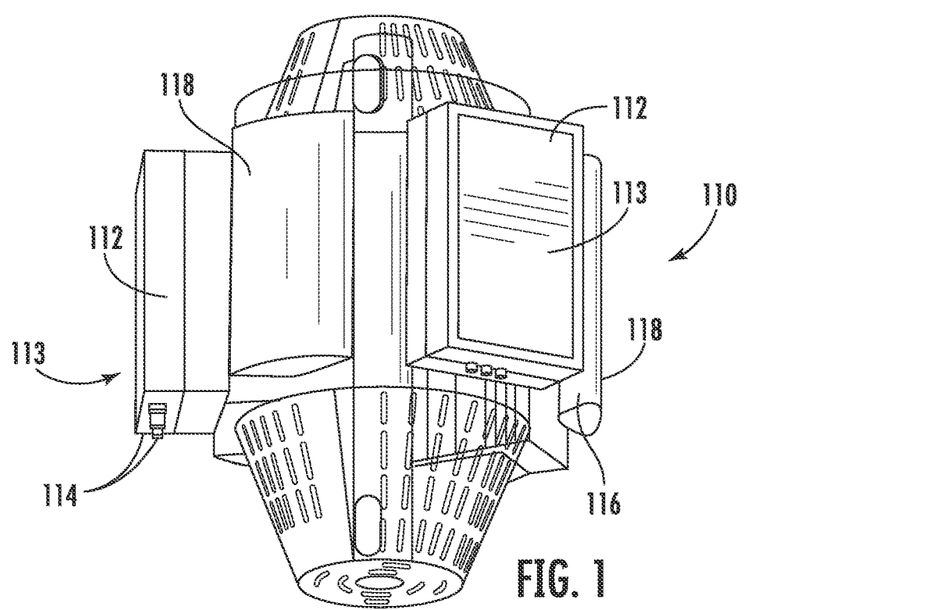
FIG. 1 is a bottom perspective view of an antenna assembly according to embodiments of the invention.
Figure 2:
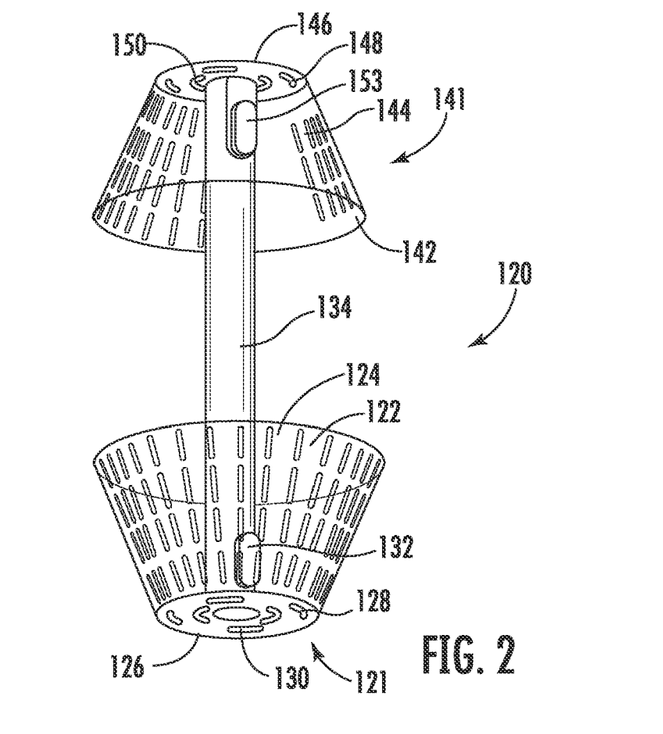
FIG. 2 is a partial bottom perspective view of the base, cap and spine of the assembly of FIG. 1.

An antenna assembly, designated broadly at 110 and shown in FIGS. 1 and 2, is mounted to the monopole 100. The antenna assembly 110 includes three antenna-radio units 112 (two of which are visible in FIG. 1) that are deployed equidistantly about the circumference of the assembly 110. The antenna-radio units 112 comprise both a transmit/receive radio and an antenna combined in the same unit (these are sometimes also known as "active" antennas). The illustrated antenna-radio units 112 are "5G" units, which are devices that meet the requisite high level of performance and precision to satisfy 5G protocols and performance requirements. In each instance the antenna-radio unit 112 has generally planar external face 113 through which signals are sent and received. However, to achieve "5G" performance, the face 113 cannot be covered or obscured (for example, with a radome or the like). The antenna-radio units 112 also include connectors 114 in their lower surfaces to provide an interface for power and signal cables. Exemplary 5G antenna-radio units 112 include those offered by Ericsson, Samsung and Nokia.

A spacer 116 having a generally wedge-shaped profile is positioned between each adjacent pair of antenna-radio units 112. Each spacer 116 includes an arcuate external surface 118 that extends between the side edges of the adjacent antenna-radio units 12. When the antenna-radio units 112 and spacers 116 are mounted, the faces 113 and external surfaces 118 form a generally cylindrical structure that is aesthetically pleasing.

The antenna assembly 110 also includes a mounting unit 120. The mounting unit 120 has a foundation 121 and a cap 141 mounted to either end of a vertical spine 134. Best seen in FIG. 2, the foundation 121 defines a truncated cone, with an exterior wall 122 and a flat base 126 at its lower end. Ventilation holes 124 are arranged in a grid-like pattern on the wall 122. A cable access hole 132 is also present in the wall 122. The base 126 is generally round and is mounted at the lower end of the spine 134. Mounting holes 128 are arranged near the perimeter of the base 126. Additionally, ventilation holes 130 are present in the base 126 near the spine 134. The base 126 is welded or otherwise joined to the lower end of the spine 134.

The cap 141 is essentially a mirror image of the foundation 121, with a wall 142 having ventilation holes 144 and a cable access hole 153 and a base 146 with similar sets of mounting holes 148 and ventilation holes 150. The cap 141 is welded or otherwise joined to the upper end of the spine 134.

Figure 3:
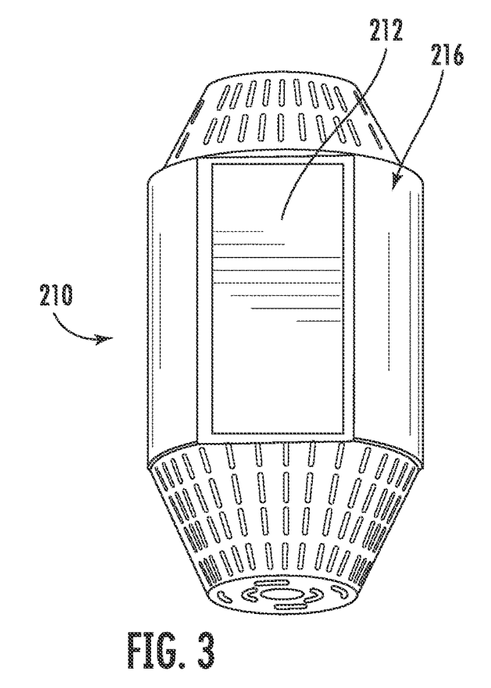
FIG. 3 is a bottom perspective view of an antenna assembly according to alternative embodiments of the invention.
Figure 4:
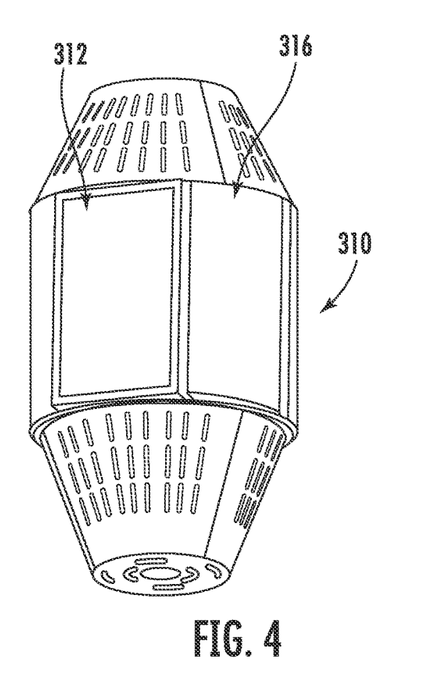
FIG. 4 is a bottom perspective view of an antenna assembly according to further embodiments of the invention.

The general arrangement of the antenna assembly 110 of FIGS. 1 and 2 can be modified to fit other antenna-radio units. For example, FIG. 3 illustrates an assembly 210 with antenna-radio units 212 that are taller and narrower than the antenna-radio units 112. The assembly 210 has spacers 216 that are taller and wider than the spacers 116. Similarly, FIG. 4 illustrates an assembly 310 that includes antenna-radio units 312 that are slightly narrower than the antenna-radio units 110, with accompanying wider spacers 316. Other configurations are also contemplated.

Figure 5:
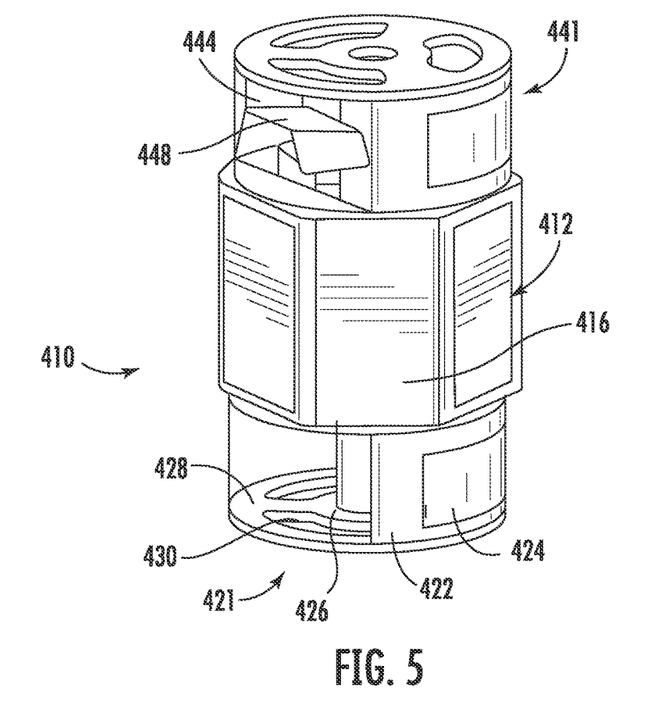
FIG. 5 is a partial top perspective view of an antenna assembly according to still further embodiments of the invention.

Referring now to FIG. 5, another antenna assembly 410 is illustrated therein. Antenna-radio units 412 and spacers 416 are similar to those discussed above. However, the foundation 421 and cap 441 of the mounting unit 420 are unlike the foundation 121 and cap 141. The foundation 421 is generally cylindrical, with an external wall 422. Three perforated areas 424 are located circumferentially equidistant from each other on the wall 422, each positioned below one of the antenna-radio units 412. The foundation 424 also includes a base 426 with arcuate slots 428 for mounting and holes 430 for ventilation.

The cap 441 is a mirror image of the foundation 421, with the exception that a hooded baffle 448 is positioned above each antenna-radio unit 412. The baffle 448 directs air used to cool the antenna-radio unit 412 to exit the cap 441 through the adjacent perforated area 444.

Figure 6:
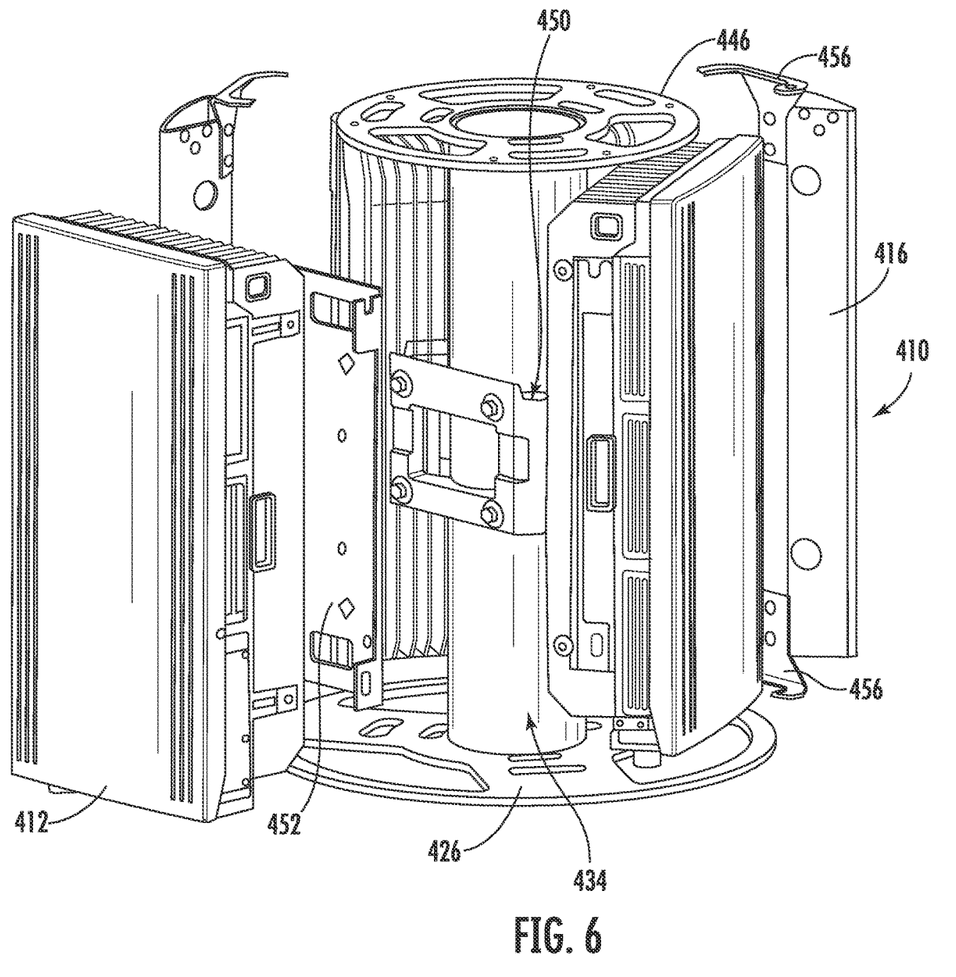
FIG. 6 is an exploded bottom perspective view of the antenna assembly of FIG. 3.

Mounting of the antenna-radio units 412 and spacers 416 is shown in more detail in FIG. 6. The bases 426, 446 are mounted on the spine 434. To serve each antenna-radio unit 412, a mounting bracket 450 is fixed to the spine 434. A mounting plate 452 is mounted to the mounting bracket 450, and a respective antenna-radio unit 412 is mounted to the mounting plate 452. Each spacer 416 includes two mounting brackets 456, one each at the upper and lower ends thereof. The mounting brackets 456 are mounted to the antenna-radio units 412 on either side of each spacer 416.

Those of skill in this art will appreciate that the antenna assemblies shown therein may take other forms. For example, other antenna-radios units may be employed, with the corresponding spacers being adjusted in height and/or arc width to generally form a cylinder. The baffles 448 included in assembly 400 may be omitted, or may be included in the assemblies 100, 200, 300. The hole patterns in the bases of the foundations and caps may vary. Other variations in the illustrated embodiments may also be employed.

Figure 9:
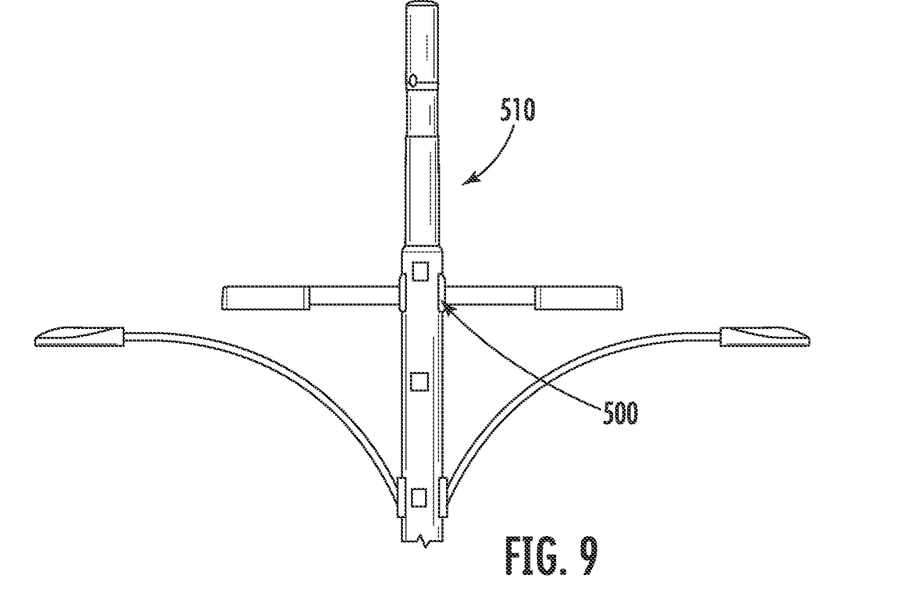
FIG. 9 is a partial front view of a monopole according to embodiments of the invention in which the mounting unit of an antenna assembly of serves as a spacer for subsequent installation of antennas.
Figure 10:
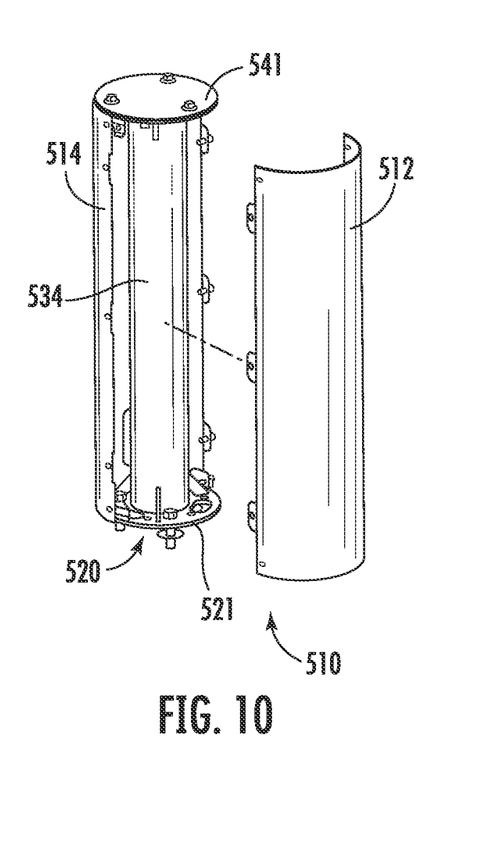
FIG. 10 is a partial exploded view of the mounting unit of the assembly of FIG. 9 with one of the cover halves removed.

Referring now to FIGS. 9 and 10, a monopole 500 is shown therein in which an assembly 510 is included. The assembly 510 has a mounting unit 520 similar to those discussed above, with a foundation 521 and a cap 541 mounted on a spine 534. In this instance there are no antennas mounted to the assembly 510, which is instead covered with two cover halves 512, 514 that form a cylinder of similar circumference to that of the foundation 521 and spine 541. The assembly 510 may be included in the monopole 500 as a "placeholder" for subsequent addition of antennas. For example, if it is anticipated that at some point in the future the monopole 500 may have antennas (e.g., active "5G" antennas) installed, but not as part of the initial installation, the assembly 510 may be included in the monopole 500 with the cover halves 512, 514 as a placeholder that can provide a more pleasing aesthetic appearance until the later installation of the antennas.

Mounting of antennas on the assembly 510 is illustrated in FIGS. 11A-15. Referring now to FIGS. 11A-12C, the mounting unit 510 is shown therein with three brackets 550 mounted thereto. Each of the brackets 550 includes a main panel 551 with a window 552. Ears 553 extend at an oblique angle from the edges of the main panel 551. Clamps 554 extend from the rear surface of the main panel 551 and "bite" into the spine 534 of the mounting unit 510. Threaded rods 555 and nuts 556 extend between adjacent ears 553 of adjacent brackets 550; once the nuts 556 are tightened onto the rods 555, the resulting ring clamps onto the spine 534.

Figures 11A, 11B, 12A, 12B, 12C:
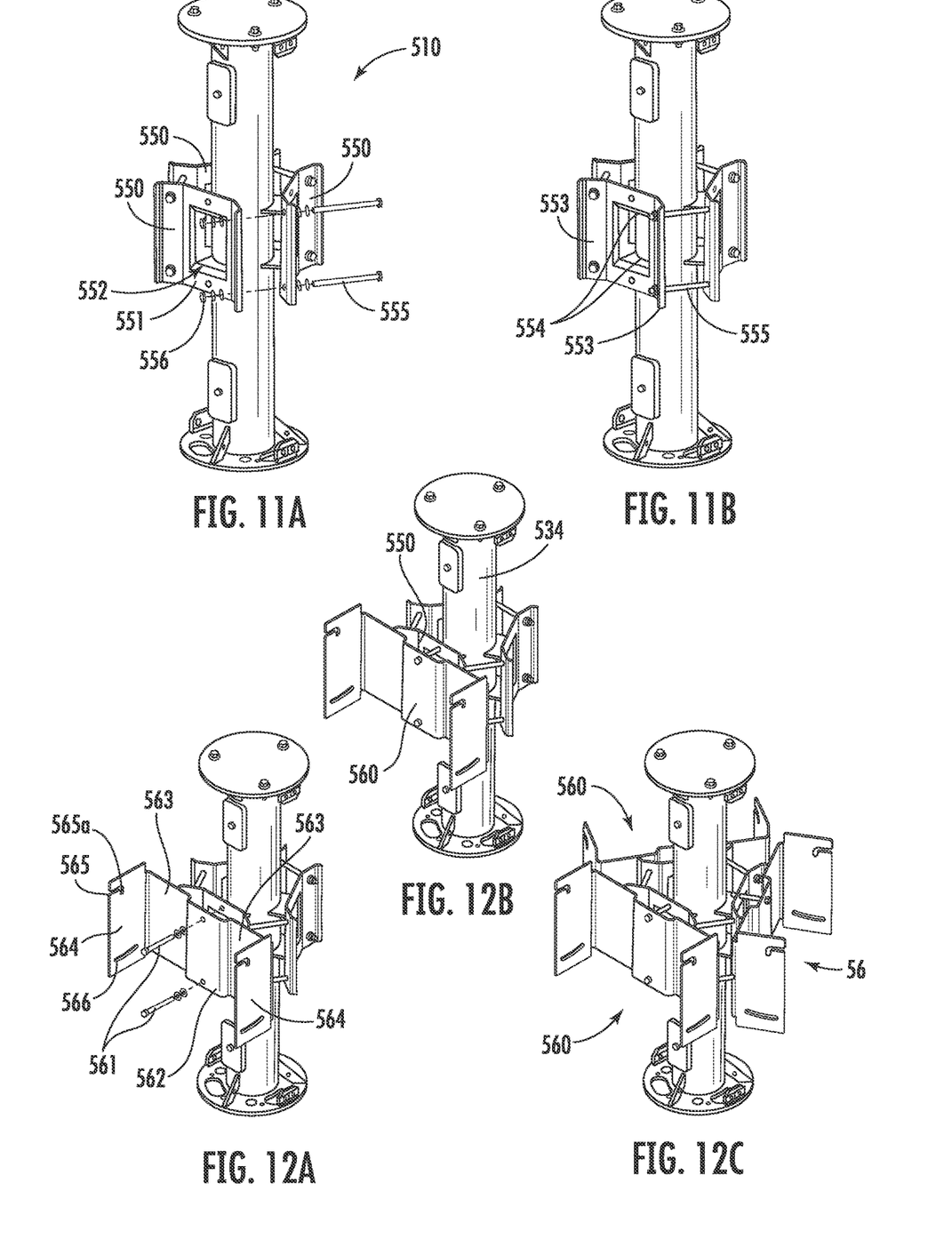
FIGS. 11A and 11B are exploded and assembled views demonstrating the assembly process of brackets on the mounting unit of FIG. 10.
FIGS. 12A-12C are sequential views illustrating the assembly process of additional brackets on the mounting unit of FIG. 10.

As shown in FIGS. 12A-12C, a larger mounting bracket 560 is mounted to each bracket 550 via two bolts 561. Each mounting bracket 560 has a central panel 562, two intermediate panels 563 that are offset from and generally parallel to the central panel 562, and two flanges 564 that are perpendicular to the intermediate panels 563. Each flange 564 includes an open-ended slot 565 with a capture recess 565a and a closed slot 566.

Figure 13A:
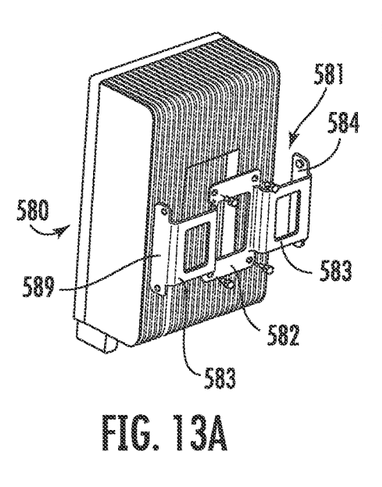
FIGS. 13A-13C are rear perspective views showing mounting hardware for different radios to be mounted to the mounting unit of FIG. 10.
Figure 13B:
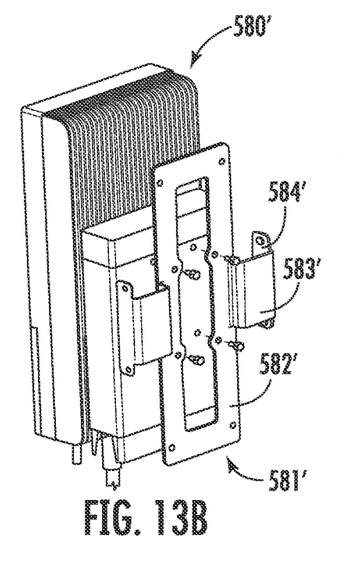
Figure 13C:
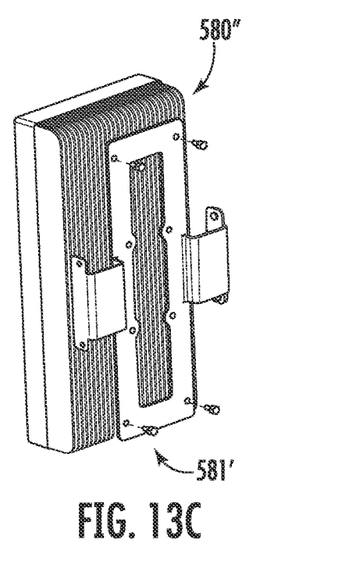
Figure 14A:
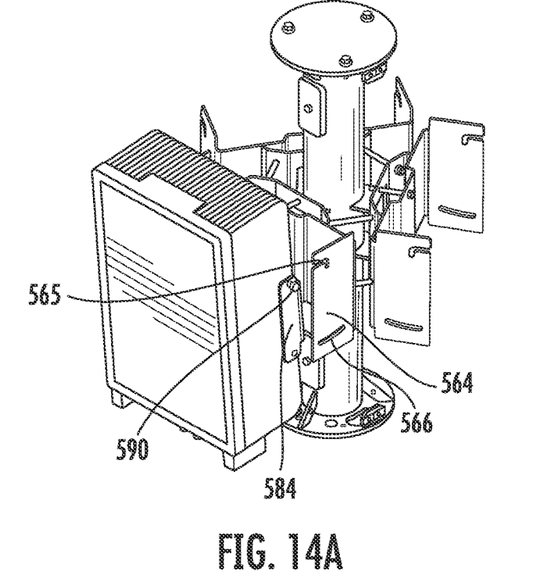
FIGS. 14A-14D are views illustrating the installation of a radio of FIG. 13A.
Figure 14B:
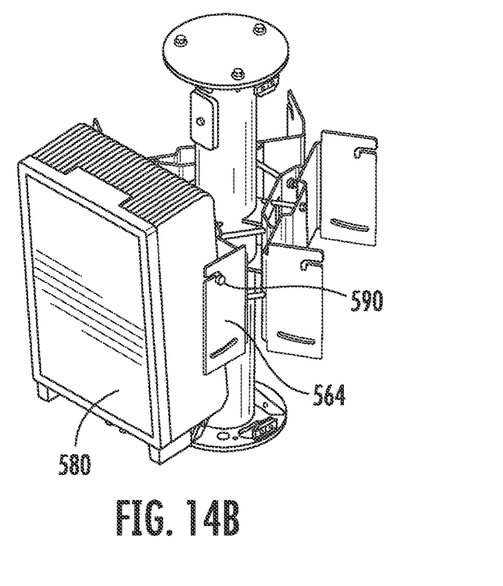
Figure 14C:
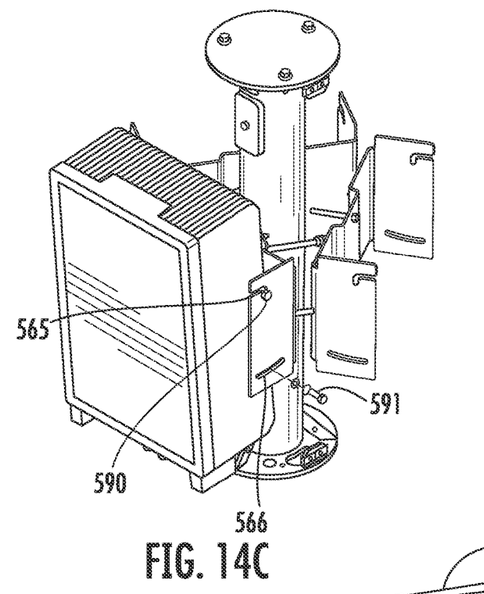
Figure 14D:
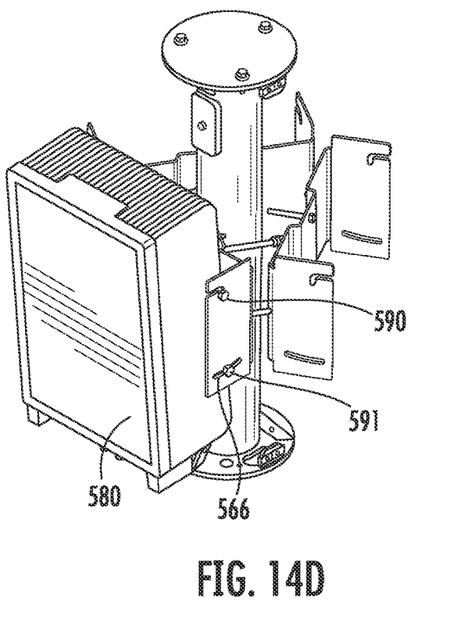

FIGS. 13A-13C illustrate three different radios 580, 580', 580" that can be mounted on the mounting brackets 560. The radio 580 is mounted with a bracket 581 having a smaller central portion 582 with two lateral extensions 583 having outer ears 584. The radios 580', 580" are mounted with a bracket 581' with a larger central portion 582' and similar lateral extensions 583' with outer ears 584'.

Figure 15:
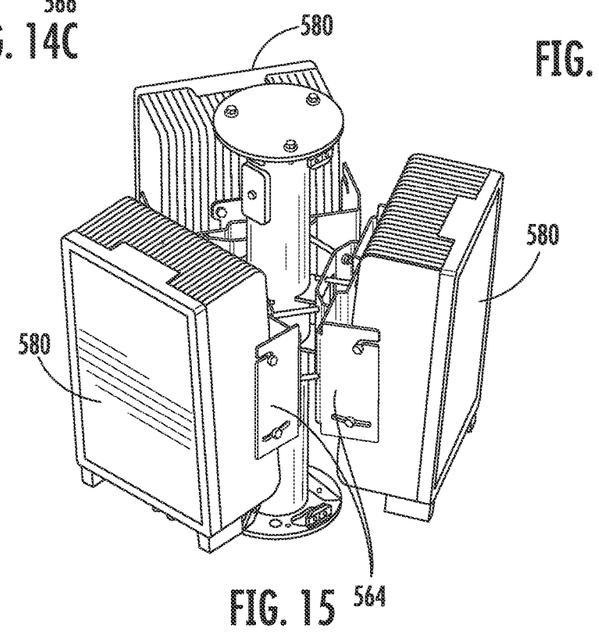
FIG. 15 is a perspective view illustrated three radios mounted on the mounting unit of FIG. 10.
Figure 16:
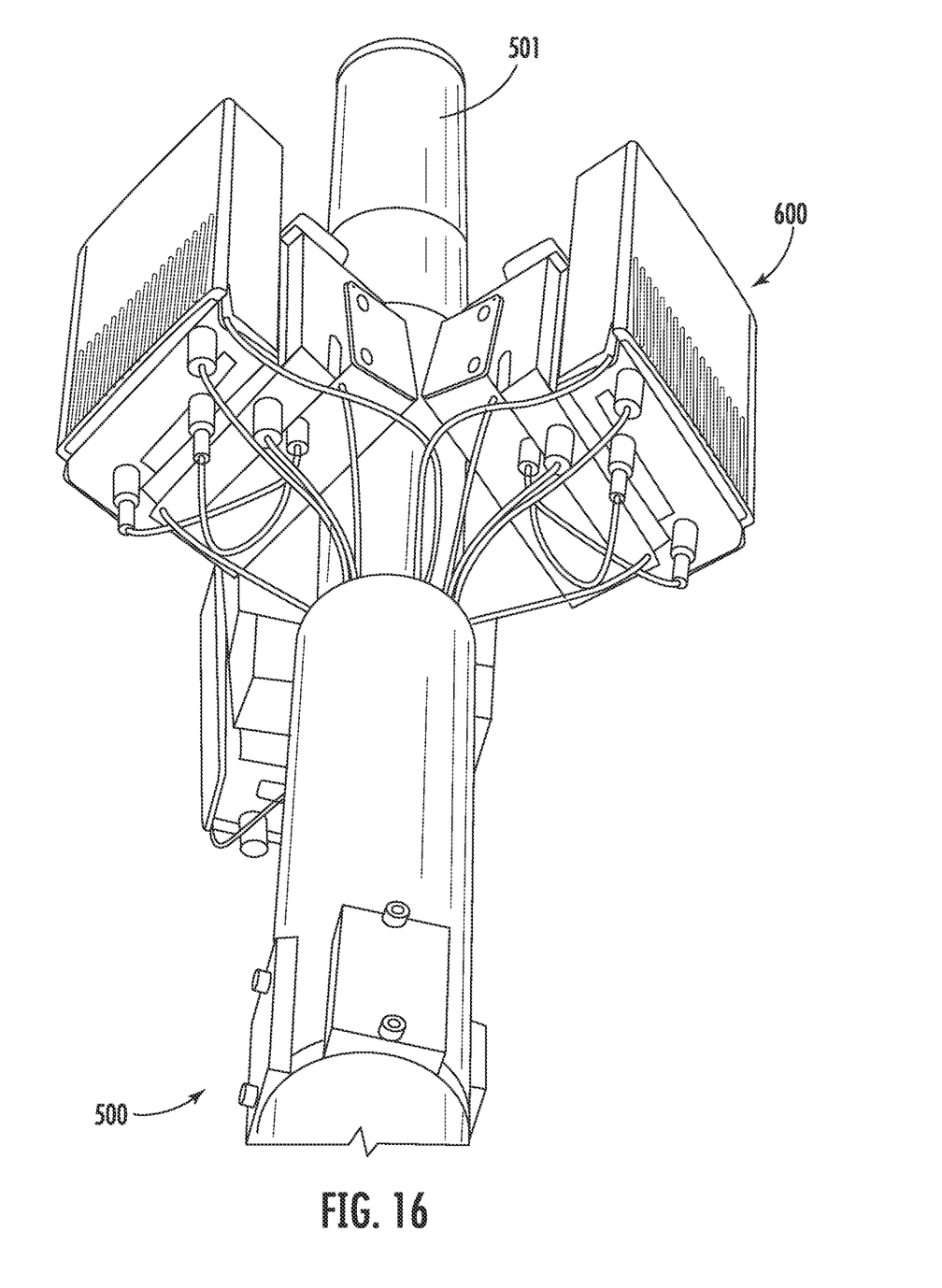
FIG. 16 is a bottom perspective view of the antenna assembly of FIG. 15 mounted on a monopole with a canister antenna mounted above it.

As can be seen in FIGS. 14A-14D, the ears 584, 584' of the mounting brackets 581, 581' receive bolts 590, 591. The bolts 590, 591 are in turn received in the slots 565 and 566 of the flanges 564. The bolts 590 are captured in the capture recesses 565a. The bolts 591 are captured in the slots 566 and can be tightened at any position along the slot 566 to mount the radio 580 at a desired angle. A completed antenna assembly 600 is shown in FIG. 15, and FIG. 16 shows the antenna assembly 600 mounted on the monopole 500 with a canister antenna 502 mounted above it.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna assembly, comprising:
 a plurality of antenna-radio units, each of the antenna-radio units comprising an antenna and a radio transceiver combined in an integrated unit residing within a single housing, each antenna having an external face;
 a mounting assembly comprising a foundation, a cap and a single elongate tubular member extending between a center of the foundation and a center of the cap to form a spine of the mounting assembly, the foundation being mounted to a lower end of the spine and the cap mounted to an upper end of the spine;
 wherein the antenna-radio units are mounted to the spine at circumferentially equally spaced locations between the foundation and the cap, with their respective external faces facing radially outwardly.

2. The antenna assembly defined in claim 1, wherein the foundation and the cap are substantially mirror images.

3. The antenna assembly defined in claim 2, wherein the foundation and cap are frusto-conical.

4. The antenna assembly defined in claim 1, wherein the foundation and cap are generally cylindrical.

5. The antenna assembly defined in claim 1, wherein the foundation and the cap are generally planar.

6. The antenna assembly defined in claim 1, wherein the foundation and cap include venting apertures.

7. The antenna assembly defined in claim 1, wherein the foundation and cap include perforated ventilation sections.

8. The antenna assembly defined in claim 1, wherein the foundation includes a cable access hole.

9. The antenna assembly defined in claim 1, wherein the cap includes a baffle.

10. The antenna assembly defined in claim 1, wherein each of the antenna-radio units is mounted to the spine via a respective first bracket.

11. The assembly defined in claim 10, wherein the first brackets are interconnected with each other via threaded rods.

12. The assembly defined in claim 10, wherein a second bracket is interposed between each antenna-radio unit and each first bracket.

13. The assembly defined in claim 12, wherein each second bracket includes slots that enable the antenna-radio mounted thereon to be downtilted.

14. The assembly defined in claim 1, mounted on a monopole.

15. The assembly defined in claim 14, further comprising a luminaire arm mounted to the monopole.

16. The assembly defined in claim 14, mounted beneath an antenna module.

* * * * *